(12) United States Patent
Luo et al.

(10) Patent No.: US 12,522,396 B1
(45) Date of Patent: Jan. 13, 2026

(54) SILICONE WATER BOTTLE

(71) Applicant: Silipint Partners LLC, Indianapolis, IN (US)

(72) Inventors: Jiale Luo, Guangdong (CN); Qiong Li, Guangdong (CN); Forrest Hoffman, Guangdong (CN); Reimann William James, Guangdong (CN); Qiang Gao, Guangdong (CN); Todd Spang, Indianapolis, IN (US)

(73) Assignee: Silipint Partners LLC, Indianapolis, IN (US)

( * ) Notice: Subject to any disclaimer, the term of this patent is extended or adjusted under 35 U.S.C. 154(b) by 0 days.

(21) Appl. No.: 18/912,107

(22) Filed: Oct. 10, 2024

(51) Int. Cl.
| | |
|---|---|
| *B65D 1/02* | (2006.01) |
| *B65D 43/02* | (2006.01) |
| *B65D 47/20* | (2006.01) |
| *B65D 53/02* | (2006.01) |

(52) U.S. Cl.
CPC .......... *B65D 1/0207* (2013.01); *B65D 1/0246* (2013.01); *B65D 43/0229* (2013.01); *B65D 47/2018* (2013.01); *B65D 53/02* (2013.01); *B65D 2543/00092* (2013.01); *B65D 2543/00509* (2013.01)

(58) Field of Classification Search
CPC ............... B65D 1/0207; B65D 1/0246; B65D 43/0239; B65D 43/0241; B65D 47/2018; B65D 47/141; B65D 43/021; B65D 47/121; B65D 25/48
USPC ..... 220/708, 705, 254.9, 715; 206/545, 546; 215/228
See application file for complete search history.

(56) References Cited

U.S. PATENT DOCUMENTS

| | | |
|---|---|---|
| D92,219 S | 5/1934 | Walton |
| 1,986,824 A | 1/1935 | Keiding |
| 2,140,327 A | 12/1938 | Angell |
| D164,618 S | 9/1951 | Yuchtmann |
| 2,895,636 A | 7/1959 | Martin |
| 4,609,113 A | 9/1986 | Seki |
| 5,226,551 A | 7/1993 | Robbins |
| 5,384,138 A | 1/1995 | Robbins et al. |
| 6,866,905 B1 | 3/2005 | Sandstrom et al. |
| 8,469,225 B2 | 6/2013 | Fredland |
| 9,254,929 B2 * | 2/2016 | Albers ................ B65D 47/068 |
| 2003/0066838 A1 | 4/2003 | Wang |

(Continued)

*Primary Examiner* — Jeffrey R Allen
(74) *Attorney, Agent, or Firm* — Woodard, Emhardt, Henry, Reeves & Wagner, LLP

(57) ABSTRACT

A bottle assembly includes a beverage receptacle defining a receptacle cavity and a rim section positioned at a distal end of the beverage receptacle. The rim section includes an inner rim surface and one or more sealing rings extending from the inner rim surface. The bottle assembly also includes a lid assembly that is attachable to the rim section of the beverage receptacle. The lid assembly includes an outer lid surface and one or more lid sealing rings extending radially outward from the outer lid surface. A nozzle defining a nozzle cavity is positionable within a nozzle housing of the lid assembly and translatable within the nozzle housing between a closed position that prevents fluid from exiting the beverage receptacle and an open position that allows fluid to exit the beverage receptacle. The beverage receptacle, the rim section, the lid assembly, and the nozzle are made substantially of silicone.

9 Claims, 13 Drawing Sheets

(56) References Cited

U.S. PATENT DOCUMENTS

| | | |
|---|---|---|
| 2003/0160055 A1 | 8/2003 | Stewart-Stand |
| 2005/0173456 A1* | 8/2005 | Backes .............. B65D 47/2018 |
| | | 222/212 |
| 2005/0184026 A1* | 8/2005 | Haley .................... B65D 47/32 |
| | | 222/484 |
| 2007/0062961 A1 | 3/2007 | Rigas |
| 2007/0199914 A1* | 8/2007 | Hung ................... B65D 47/243 |
| | | 215/311 |
| 2007/0267424 A1 | 11/2007 | Marks |
| 2020/0047948 A1* | 2/2020 | Zitron .................... B65D 25/04 |
| 2020/0085217 A1* | 3/2020 | Heiberger .............. B65D 51/24 |

* cited by examiner

SILICONE WATER BOTTLE

BACKGROUND OF THE INVENTION

The present invention is directed to improvements in beverage receptacles. Traditionally, the majority of beverage receptacles were made of glass. This included everyday reusable glassware, beer and soda bottles, wine bottles, milk jugs, and the like. However, glass receptacles are fragile and thus difficult to transport. To address this problem, as well as others, beverage receptacles made from a number of different materials came about. These materials include different varieties of plastic as well as aluminum. However, the overwhelming majority of these materials were designed to create a rigid beverage receptacle. It was commonly accepted that a semi-rigid beverage receptacle was undesirable. For example, compression of the sides of a receptacle could reduce its effective volume leading to spillage. Nevertheless, when the need for cheaper and/or disposable beverage receptacles came along, semi-rigid materials such as thinner plastics, paper, and polystyrene foam were used. However, these cheaper beverage receptacles all suffered from the same problem—they were subject to fatigue and failure.

Despite the disadvantages of disposable beverage receptacles, they do offer some advantages, including being easily deformed and/or compressed. Furthermore, as opposed to receptacles made from glass, disposable beverage receptacles are less fragile. Such characteristics reduce the storage space needed for such receptacles, when not full of a select beverage. However, due to fatigue, any significant deformation or folding typically results in a tear, rendering the receptacle inoperable, and therefore the value of these features is realized only after the receptacle has been thrown away and it is being hauled off.

Therefore, it is an object of the present invention to provide a semi-rigid beverage receptacle which exhibits the ability to deform and/or be compressed without suffering from fatigue. It is a further object of the invention to provide semi-rigid beverage receptacle with sufficiently rigid sides to prevent undesirable spilling when in use, while remaining flexible enough so as to be foldable and compressible when not in use. It is a still further object of the invention to provide a beverage receptacle which is, for all practical purposes, unbreakable.

SUMMARY OF THE INVENTION

A bottle assembly may comprise a beverage receptacle having a rim section, a lid assembly, and a nozzle. Each of these components of the beverage receptacle may be made substantially of silicone, or in some instances, completely of silicone. The beverage receptacle may include a base and least one sidewall and the beverage receptacle may define a receptacle cavity.

The rim section may be positioned at a distal end of the beverage receptacle and may include an inner rim surface and one or more rim sealing rings extending from the inner rim surface into the receptacle cavity. In some embodiments, the rim section may include a sealing flange extending from the inner rim surface into the receptacle cavity, and the sealing flange may extend farther radially inward into the receptacle cavity than the one or more rim sealing rings.

The lid assembly may include a lid body including an outer lid surface and an inner lid surface and defining a lid cavity. The lid body may also include one or more lid sealing rings extending radially outward from the outer lid surface and a sealing flange recess defined through the outer lid surface of the lid body. A lid skirt may be attached to the lid body and extend radially outward from the lid body. The lid skirt may include a lid tab extending radially outward from the lid tab and a lid lip that may extend from a bottom surface of the lid tab. The lid body may also include a nozzle housing including an upper portion extending above the lid skirt and a lower portion extending into the lid cavity and defining a nozzle opening. The lower portion of the nozzle housing may include a nozzle housing bottom surface and one or more housing supports to attach the nozzle housing bottom surface to the upper portion of the nozzle housing. A nozzle support may extend from the nozzle housing bottom surface into the nozzle opening. A nozzle housing opening may be defined between adjacent housing supports of the one or more housing supports.

The nozzle may include a nozzle body that defines a nozzle cavity. In some examples, one or more nozzle ribs may extend radially outward from the nozzle body. In some instances, the nozzle may be removably attachable to the lid assembly. Additionally, one or more nozzle wings may extend radially outward from the nozzle body. The one or more nozzle wings may each extend radially outward from the nozzle body at a distance that is greater than the distance extended by each of the one or more nozzle ribs.

The nozzle may be fit within the nozzle housing of the lid assembly so that the nozzle is translatable within the nozzle housing of the lid assembly. The lid assembly may be positionable within the receptacle cavity at the rim section so that the lid assembly is removably attachable to the beverage receptacle. The rim sealing rings may interlock with the lid sealing rings when the lid assembly is attached to the beverage receptacle. In some instances, the lid assembly is configured to be attachable to the rim section of the beverage receptacle by applying a translational force and without rotation of the lid assembly or the beverage receptacle.

The nozzle may be positionable in an open position within the nozzle housing, and the nozzle cavity may be in fluid communication with the receptacle cavity when the nozzle is in the open position. The nozzle is also positionable in a closed position within the nozzle housing, and fluid within the receptacle cavity may be unable to flow from the receptacle cavity into the nozzle cavity when the nozzle is in the closed position. In some embodiments, the nozzle support of the lid assembly may be fit within the nozzle cavity when the nozzle is positioned within the nozzle housing. In certain aspects, when the nozzle is in the closed position, the nozzle is in contact with the nozzle housing bottom surface, and when the nozzle is in the open position, the nozzle is not in contact with the nozzle housing bottom surface.

In some examples, the base of the beverage receptacle may define a receptacle base plane and the one or more rim sealing rings may each define a respective rim sealing ring plane, and each of the rim sealing ring planes may be parallel with respect to the receptacle base plane. Further, in some embodiments, each of the lid sealing rings may define a respective lid sealing ring plane, and each lid sealing ring plane may be parallel with respect to each of the rim sealing ring planes.

DETAILED DESCRIPTION OF THE INVENTION

Figure 1:
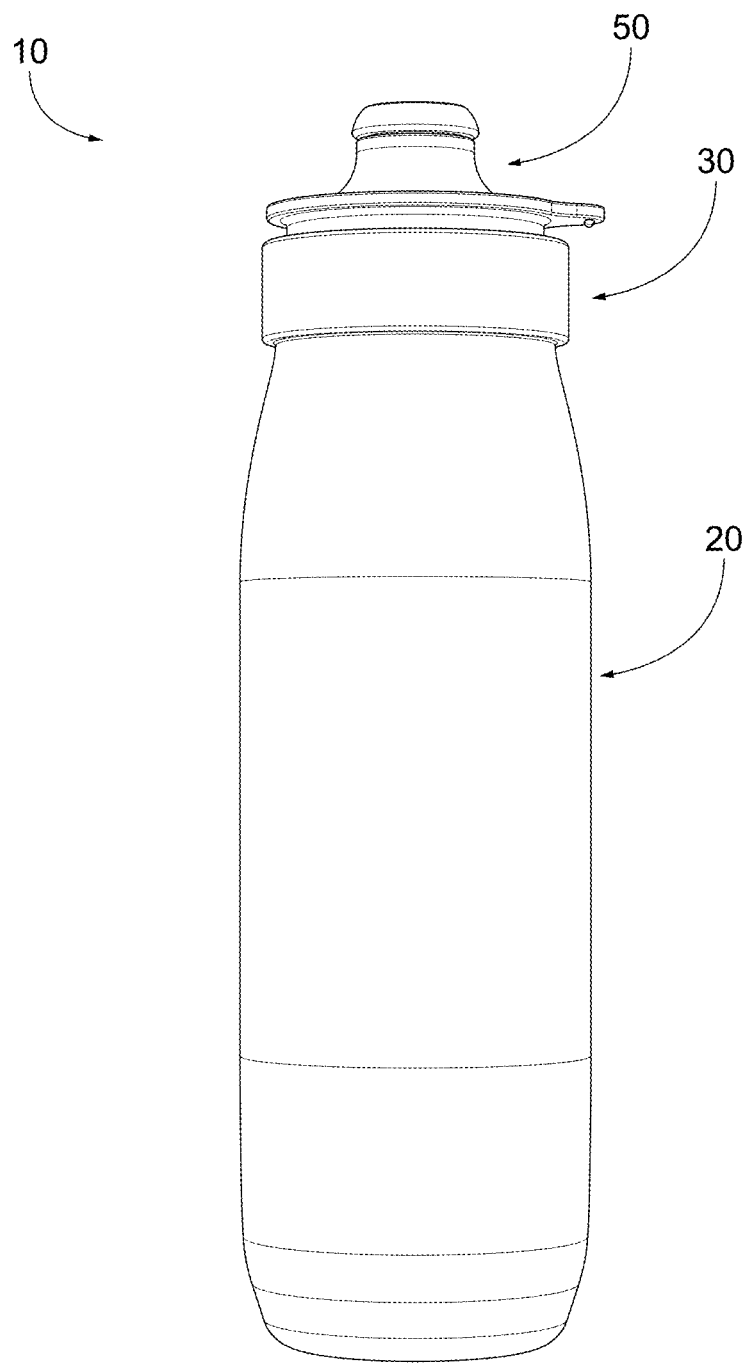
FIG. 1 is a front view of a semi-rigid squeezable bottle assembly.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. Additionally, in the following description, like reference characters designate like or corresponding parts throughout the several views.

Directional terms, such as forward, rearward, top, bottom, etc., are used in this description with reference to the specific embodiment shown and used for purposes of clarity. It should be recognized that these terms are not meant to be limiting. As a specific example the term proximal is used to indicate a direction toward the base of the bottle assembly and the term distal is used to indicate a direction toward the nozzle of the bottle assembly where a liquid would exit the bottle assembly during use.

The present invention relates generally to drinkware and in particular to drinkware including a lid where the receptacle and the lid are formed from pliable materials, such as silicone. The novel non-rigid drinkware may be formed into any one of the traditional drinkware shapes that include a lid. However, for purposes of illustration, the novel beverage receptacles of the present invention will be described herein with respect to an exemplary squeeze bottle.

By being manufactured principally of silicone, the novel drinkware enjoys the following desirable characteristics: it is dishwasher safe, microwave safe, oven safe up to and exceeding 600° F., flexible/foldable, and under normal circumstances—unbreakable. Furthermore, when used in the present invention, the flexibility of the silicone material differentiates the drinkware of the present invention from existing drinkware in a number of ways. First, the novel drinkware is pliable, foldable and bendable, so that it can safely travel without fear of breakage or injury. Furthermore, the form will easily return to its original shape, absent any appreciable wear or tearing/fatigue to the material, thereby enabling the drinkware to be stored in a smaller space that required by drinkware formed from rigid materials. Furthermore, the novel drinkware does not suffer from the breaking concerns presented by traditional glassware. In addition, by having a secure lid, the risk of spillage from the semi-rigid nature of the bottle is alleviated.

Figure 2:
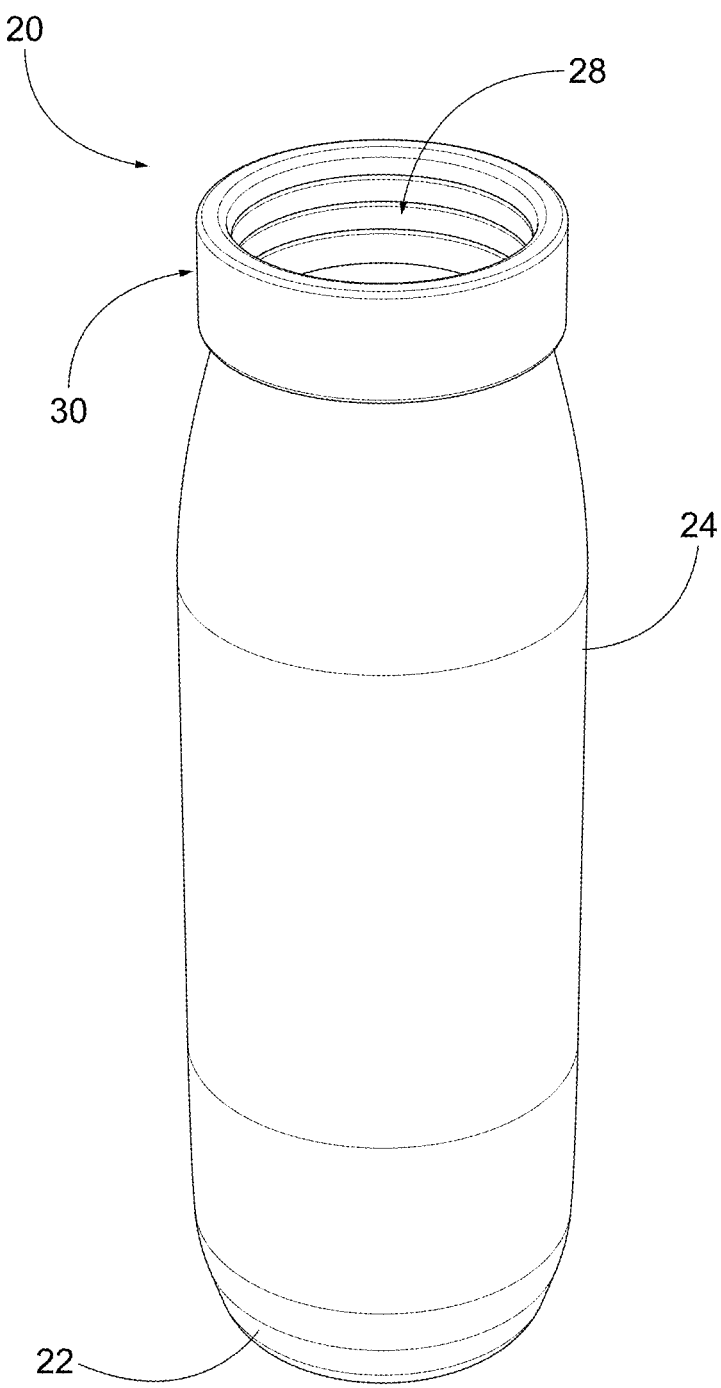
FIG. 2 is a top perspective view of a beverage receptacle of the bottle assembly of FIG. 1.

A front view of an illustrative semi-rigid squeezable beverage bottle assembly 10 is shown in FIGS. 1-2. The bottle assembly 10 includes a beverage receptacle 20 and a lid assembly 50 that is removably attachable to the beverage receptacle 20. As shown in FIG. 2, the beverage receptacle 20 includes a base 22, a sidewall 24 and a rim section 30. The rim section 30 has an annular shape and is positioned at the distal end of the sidewall 24 with respect to base 22. Rim section 30 defines the opening to a receptacle cavity 28 that is defined within and formed by the sidewall 24 and the base 22.

In some embodiments, the sidewall 24 has a thickness of approximately 3/16" which is sufficient to provide the appropriate durometer (stiffness of material). Sidewall 24 should be both rigid enough to maintain its shape when gripped, yet soft enough to exhibit its functional durability and pliability. Alternatively, in certain other embodiments, the thickness of the sidewall 24 may be between 1/16" and 1/2", depending upon the desired rigidity. As will be appreciated by those of skill in the art, other thicknesses are contemplated and should be considered within the scope of the present invention. Furthermore, the thickness and durometer of the materials utilized will vary depending on the particular shape, size and overall design of the beverage receptacle 20 desired.

The receptacle cavity 28 may be sized to provide the capacity for a desired amount of fluid to be held by the receptacle 20. In some instances, the receptacle cavity 28 may be sized to provide capacity for approximately 30 or 32 fluid ounces, depending upon American or European standards. However, in other embodiments, receptacle the cavity 28 may be sized to provide capacity for more or less fluid as desired. As an example, in some embodiments, the receptacle cavity 28 may be sized to provide capacity for 16 ounces or 20 fluid ounces, or in other embodiments, the receptacle cavity 28 may be sized to provide capacity for 48 fluid ounces.

In certain embodiments, the base 22 of the receptacle 20 may be circular in shape and may have a diameter between 2 in. and 3 in. Additionally, the vertical height of the receptacle 20 including the sidewall 24 and the rim section 30 may be between 9 in. and 10 in. Other dimensions are contemplated for other liquid capacities, with the profile shown being a baseline, but not a requirement.

In some embodiments, the inside surface of receptacle 20 is polished smooth to allow easy cleaning and improve the pour of beverages contained therein. Although not shown, it shall be appreciated that many different textures and patterns may be applied to the outside of sidewall 24 and/or the remaining portions of receptacle 20, such as to enhance its gripability, aesthetics, or to include a design element.

Figure 3:
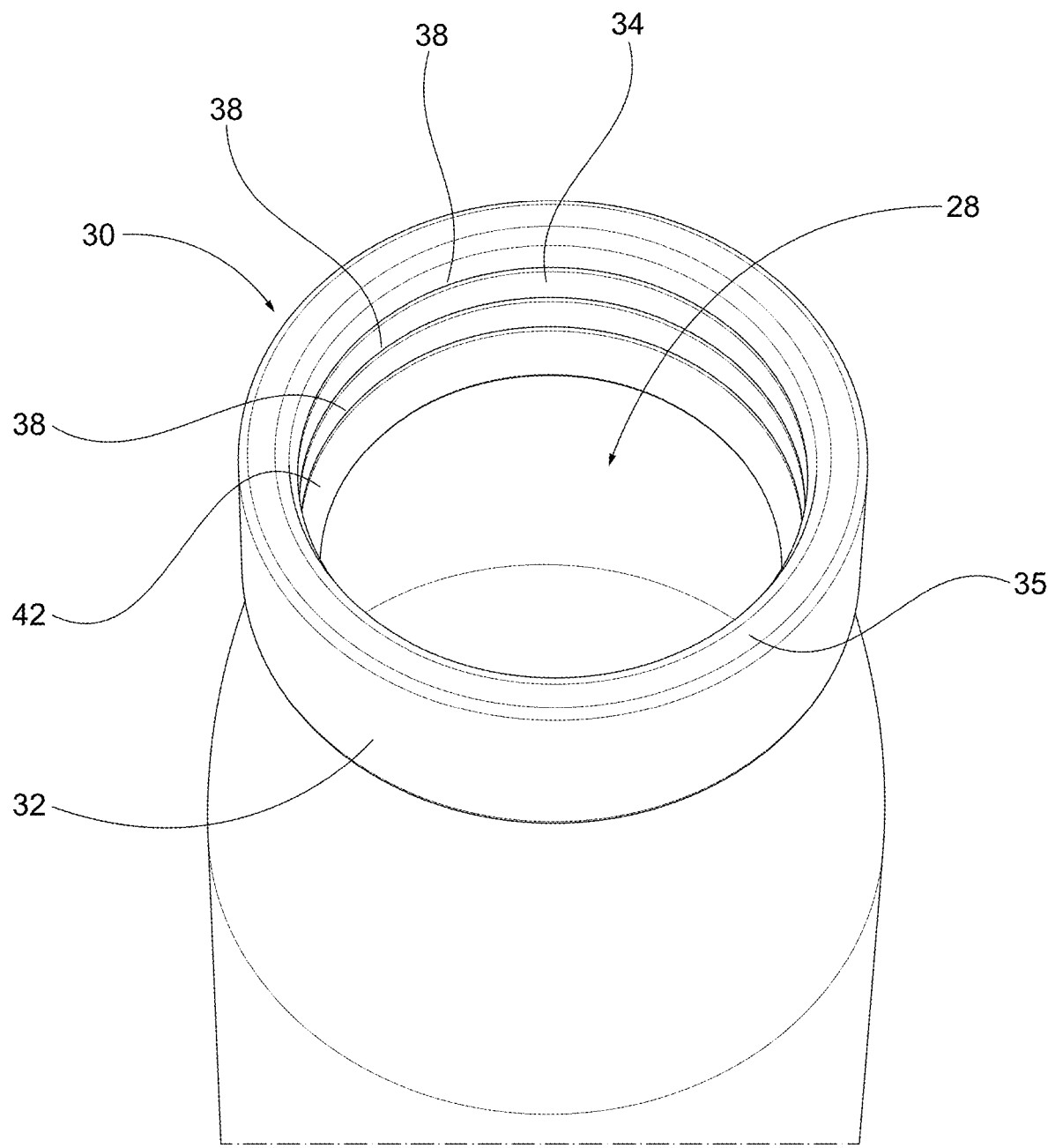
FIG. 3 is a top perspective view of a lid section of the beverage receptacle of FIG. 2.
Figure 4:
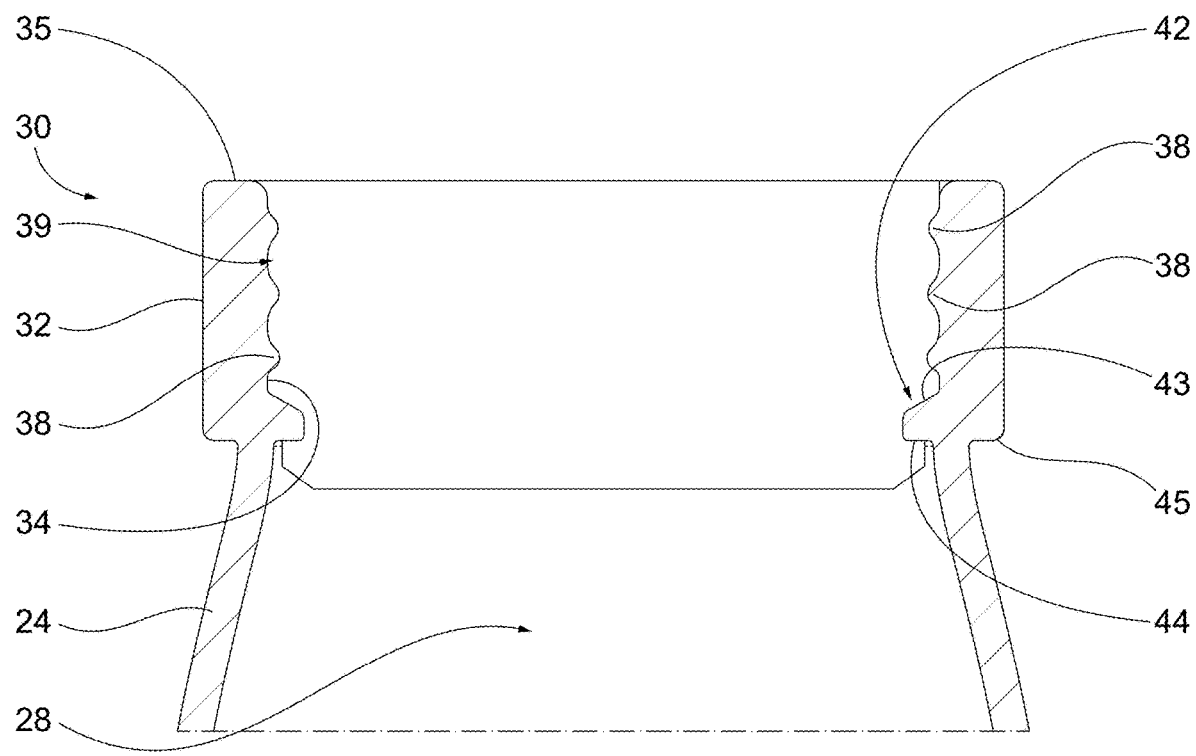
FIG. 4 is a cross-sectional view of the lid section of FIG. 3.

The rim section 30 of the receptacle 20 is shown in more detail in FIGS. 3-4. FIG. 3 illustrates a top perspective view of the rim section 30 of the receptacle 20, while FIG. 4 is a cross-sectional view of the rim section of the receptacle 20. The rim section 30 includes an outer rim surface 32 and an inner rim surface 34. The rim section 30 also includes a receptacle rim 35 at the distal end of the receptacle 20. The outer rim surface 32 is positioned radially outward of the distal end of the sidewall 24, where the sidewall 24 attaches to the rim section 30.

A number of rim sealing rings 38 extend inward from the inner rim surface 34. A rim sealing ring gap 39 is defined between each of the adjacent rim sealing rings 38. In the embodiment shown, there are a total of three rim sealing rings 38, but in other embodiments more rim sealing rings 38 or fewer rim sealing rings 38 may be present as desired. For example, in some embodiments, there could be a single rim sealing ring 38 or there could be four or five sealing rings 38. Each of the rim sealing rings 38 extends around the entire circumference of the inner rim surface 34, and the rim sealing rings 38 are arranged so that each rim sealing ring 38 lies in a parallel plane with respect to the other rim sealing rings 38. In the embodiments shown in FIG. 3, the rim sealing rings 38 are also parallel to the receptable rim 35 and also have a semi-circular cross-sectional shape. However, in other embodiments, the rim sealing rings 38 may have other suitable orientations or cross-sectional shapes. For example, the rim sealing rings 38 may have a rectangular shape, a square shape, or conical shape. In some embodiments, each of the rim sealing rings 38 may have the same cross-sectional shape, but in other embodiments, the rim sealing rings 38 may have different cross-sectional shapes, as desired.

A pressure-resistant, sealing flange 42 also extends from the inner rim surface 34, and is positioned proximal of the rim sealing rings 38, in the direction closer to the sidewall 24 of the receptacle 20 than the rim sealing rings 38. The sealing flange 42 extends around the circumference of the inner rim surface 34.

In the embodiment shown, the sealing flange 42 has a length that is greater than the length of the rim sealing rings 38 so that the sealing flange 42 extends radially into the receptacle cavity 28 farther than the rim sealing rings 38. Additionally, in the embodiment shown in FIG. 3, the sealing flange 42 includes a sloped distal surface 43 and a proximal surface 44. The proximal surface is arranged to be substantially parallel with respect to the base 22 of the receptacle 20 while the sloped distal surface 43 is positioned at an oblique angle with respect to the proximal surface 44. An inner sealing flange surface 45 connects the distal surface 43 to the proximal surface 44 and is arranged substantially perpendicular with respect to the proximal surface 44.

In some embodiments, the rim section 30 has a thickness of approximately ¼" between the outer rim surface 32 and the inner rim surface 34 to provide the appropriate durometer for the rim section. Alternatively, in certain other embodiments, the thickness of the rim section 30 may be between ⅛" and ½", depending upon the desired rigidity. As will be appreciated by those of skill in the art, other thicknesses are contemplated and should be considered within the scope of the present invention. The rim section 30 must have sufficient thickness to maintain rigidity and a watertight seal, but still allow flexibility. Further, in some embodiments, the height of the beverage receptacle 20 and the rim section 30 is approximately 9½", and in other embodiments the height of the beverage receptacle and the rim section 30 is approximately between 9"-10".

Figure 5:
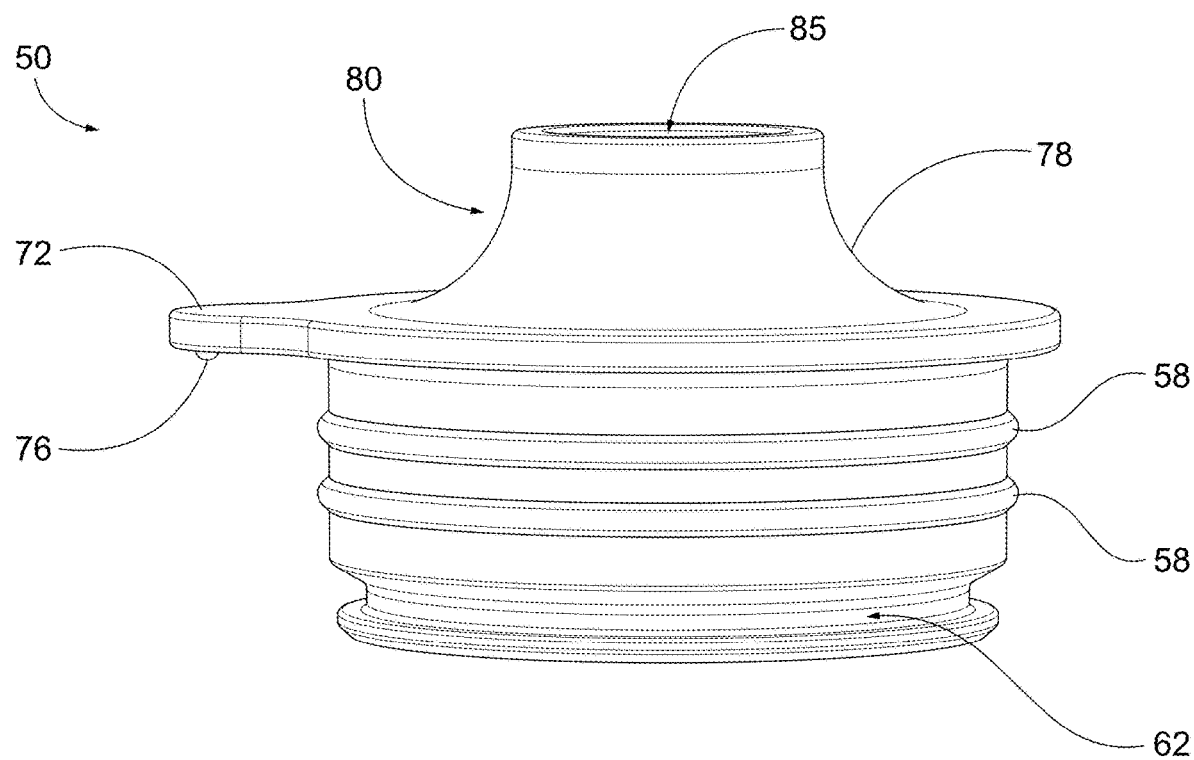
FIG. 5 is a front view of a lid assembly of the bottle assembly of FIG. 1.
Figure 6:
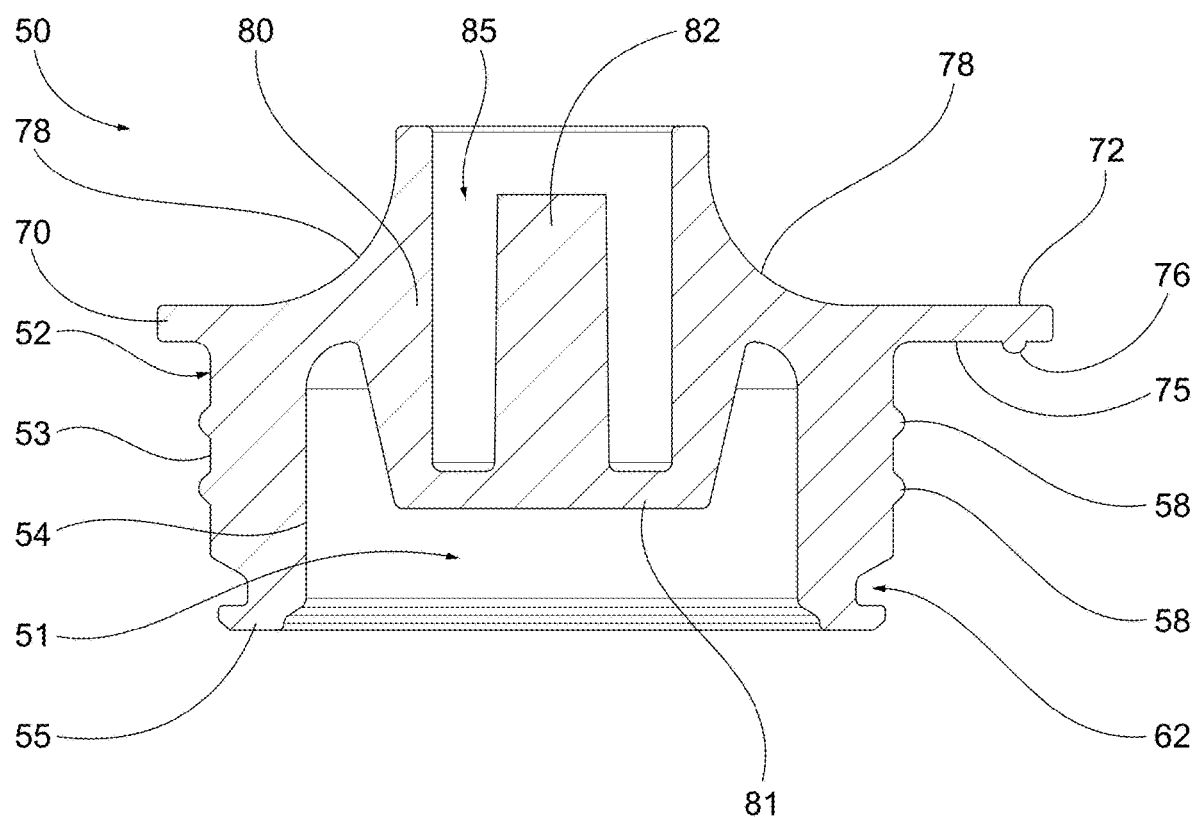
FIG. 6 is a cross-sectional view of the lid assembly of FIG. 5.

A front elevation view of the lid assembly 50 is shown in FIG. 5, and a cross-sectional view of the lid assembly 50 is shown in FIG. 6. The lid assembly 50 includes a lid body 52 that has an outer lid surface 53 and an inner lid surface 54 and lid base 55. A lid cavity 51 is defined within the lid body 52 and surrounded by the inner lid surface 54. A number of lid sealing rings 58 are positioned around a circumference of the lid body 52, extending from the outer lid surface 53. A lid sealing ring gap 59 is defined between adjacent lid sealing rings 58. In the embodiment shown, there are a total of two lid sealing rings 58. However, in other embodiments there may be fewer or more lid sealing rings 58 as desired. In certain embodiments, there may be a total of one less lid sealing rings 58 than the number of rim sealing rings 38 on the rim section 30. This allows the lid sealing rings 58 to fit between the rim sealing rings 38 when the lid assembly 50 is attached to the rim section 30.

The lid assembly 50 also includes a sealing flange recess 62 defined through the outer lid surface 53 of in the lid body 52. The sealing flange recess 62 is defined around the entire circumference of the lid body 52. The sealing flange recess 62 is shaped to correspond to the sealing flange positioned around the inner rim surface 34 of the rim section 30. In the embodiment shown, the sealing flange recess 62 is positioned below the lid sealing rings 58, closer to the base 22 of the receptacle 20. The sealing flange recess 62 is defined around the entire circumference of the lid body 52 and extends only through the outer lid surface 53 and not through the inner lid surface 54.

In some embodiments, the lid body 52 has a thickness of approximately ⅜" between the outer lid surface 53 and the inner lid surface 54 to provide the appropriate durometer for the lid body 52. Alternatively, in certain other embodiments, the thickness of the lid body 52 may be between ⅛" and ¾", depending upon the desired rigidity. As will be appreciated by those of skill in the art, other thicknesses are contemplated and should be considered within the scope of the present invention. The lid assembly 50 must have sufficient thickness to maintain rigidity and a watertight seal, but still allow flexibility. Further, in some embodiments, the lid assembly 50 has a height of approximately 1⅝" and in other embodiments, the lid assembly 50 has a height between approximately 1¼" and 2".

The lid assembly 50 includes a lid skirt 70 that extends from a distal end of the lid body 52. In the embodiment shown, the lid skirt 70 extends around the entire circumference of the outer lid body 52. Different portions of the lid skirt 70 may extend radially outward from the outer lid surface 53 at different radial lengths. For example, a lid tab 72 may extend radially outward from the lid skirt 70 so that the lid skirt 70 has a greater diameter at the lid tab. The lid tab 72 may also include a lid lip 76 that extends from a bottom surface 75 of the lid tab 72. The lid tab 72 provides a gripping surface for a user, so that the user may grab the lid skirt 70 at the lid tab 72 when removing the lid assembly 50 from the rim section 30. The lid lip 76 provides an additional grip surface to assist the user in gripping the lid skirt 70.

In alternative embodiments, the lid skirt 70 may not include the lid tab 72 so that the lid skirt 70 extends an equal length from the outer lid surface 53 around the entire circumference of the lid body 52. In these embodiments, a lid lip 76 may still be present on the bottom surface 75 of the lid skirt 70 around the full circumference of the lid skirt 70 or around a portion of the circumference of the lid skirt 70.

A nozzle housing 80 is connected to the lid skirt 70 by a nozzle housing connecting surface 78. In the embodiment shown, the nozzle housing connecting surface 78 is curved to define a smooth surface. An upper portion of the nozzle housing 80 extends above the lid skirt 70 and a lower portion of the nozzle housing 80 extends below the lid skirt 70, into the lid cavity 51. The lower portion of the nozzle housing 80 includes a nozzle housing bottom surface 81 and a nozzle support 82 that extends from the nozzle housing bottom surface 81. A nozzle opening 85 is defined partially through the nozzle housing 80 to the nozzle housing bottom surface 81. The nozzle support 82 extends from the nozzle housing bottom surface 81 into the nozzle opening 85.

Figure 7:
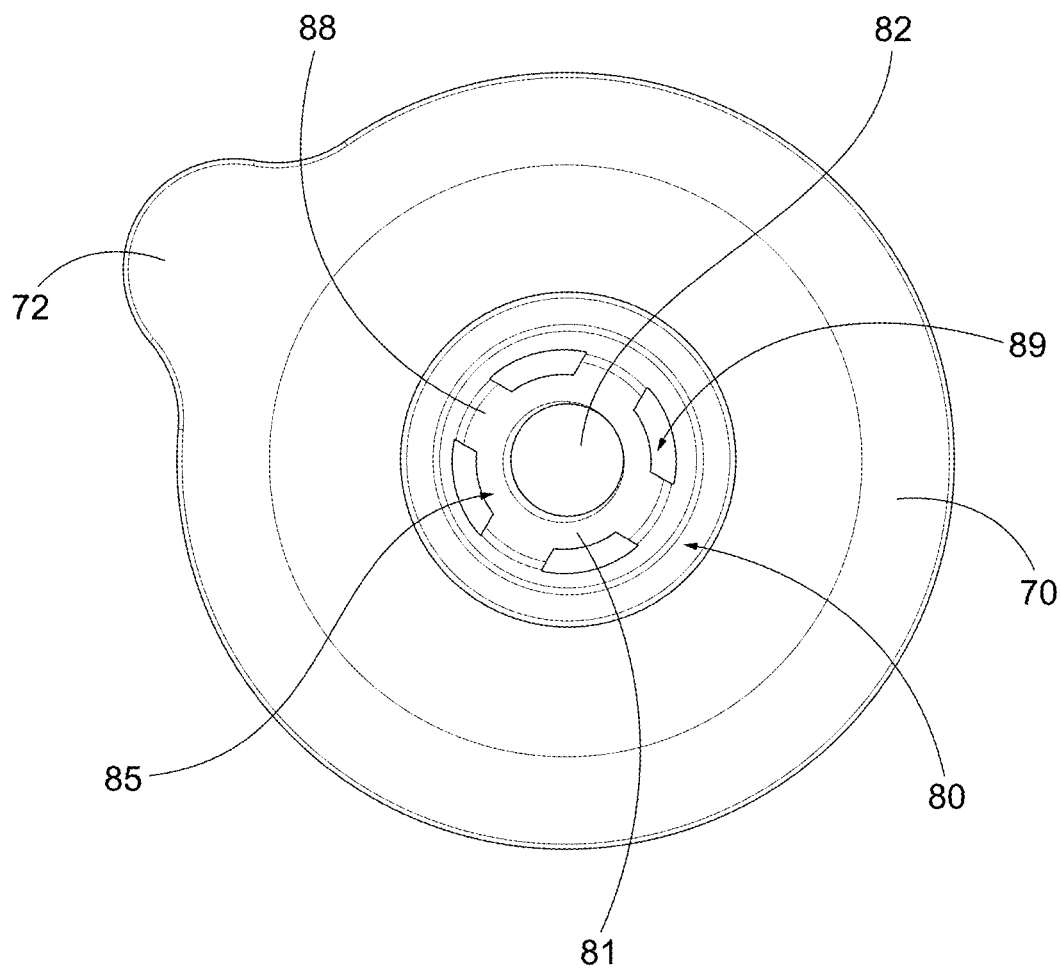
FIG. 7 is a top view of the lid assembly of FIG. 5.
Figure 8:
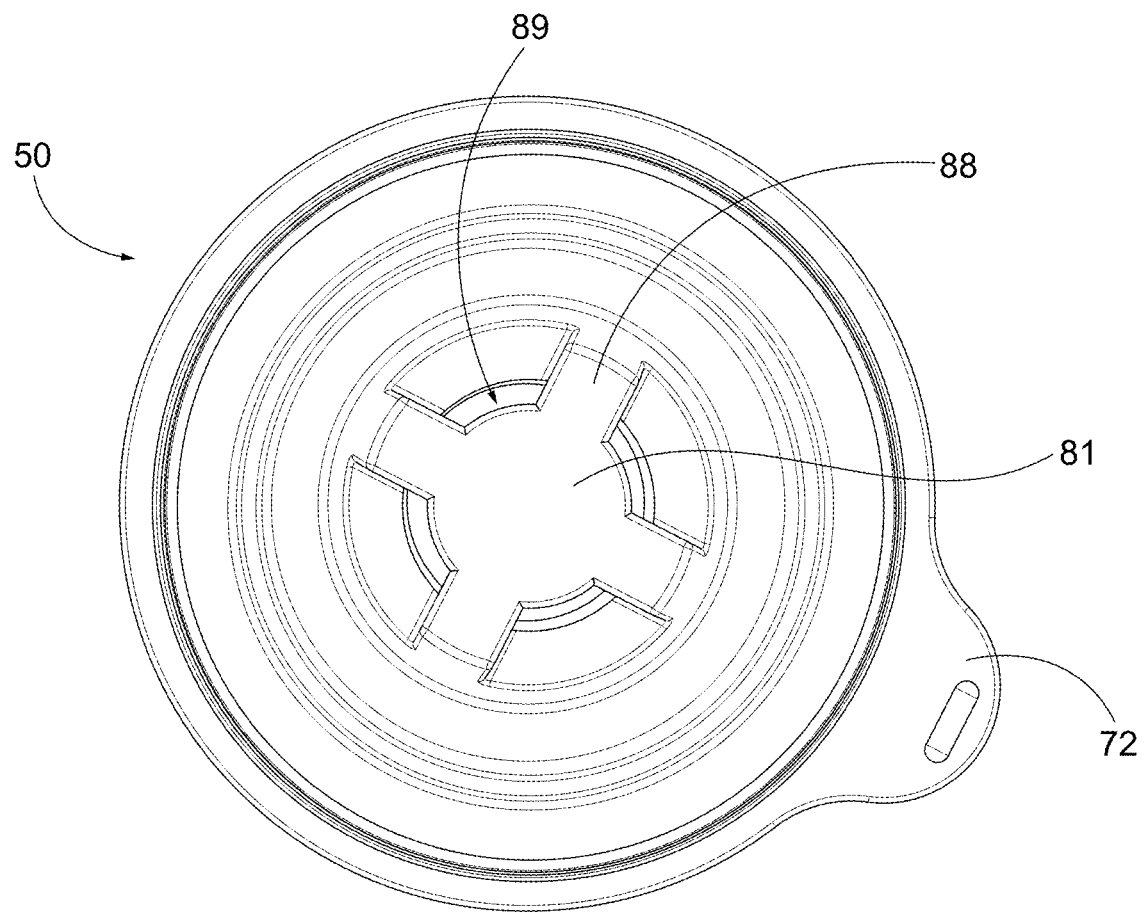
FIG. 8 is a bottom view of the lid assembly of FIG. 5.

As shown in FIGS. 7-8, the nozzle housing bottom surface 81 has a circular shape and the nozzle support 82 is cylindrical. The nozzle housing bottom surface 81 has a diameter that is greater than the diameter of the circular cross section of the nozzle support 82. The nozzle housing bottom surface 81 is attached to the upper portion of the nozzle housing 80 by nozzle housing supports 88. Nozzle housing openings 89 are defined between the nozzle housing supports 88. In the embodiment shown, the nozzle housing supports 88 are equally spaced around the perimeter of the nozzle housing bottom surface 81.

Figure 9:
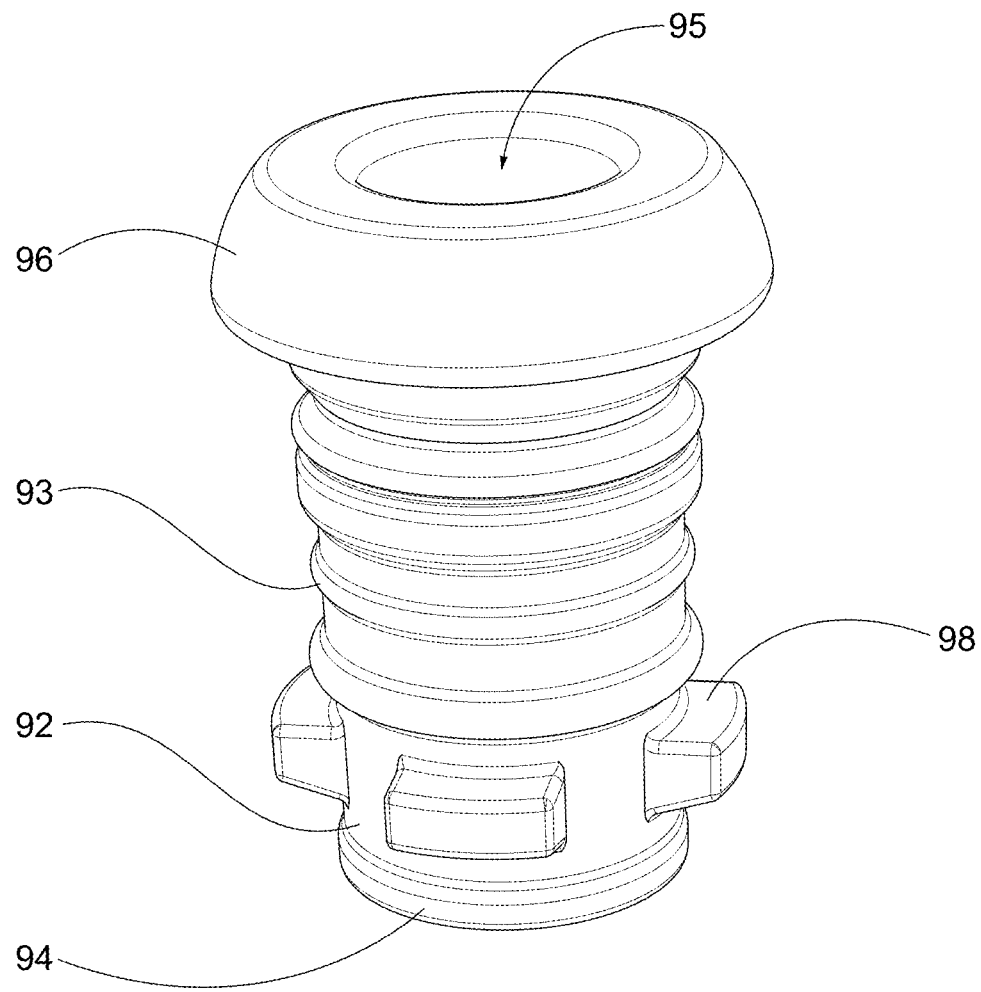
FIG. 9 is a front view of a nozzle of the bottle assembly of FIG. 1.
Figure 10:
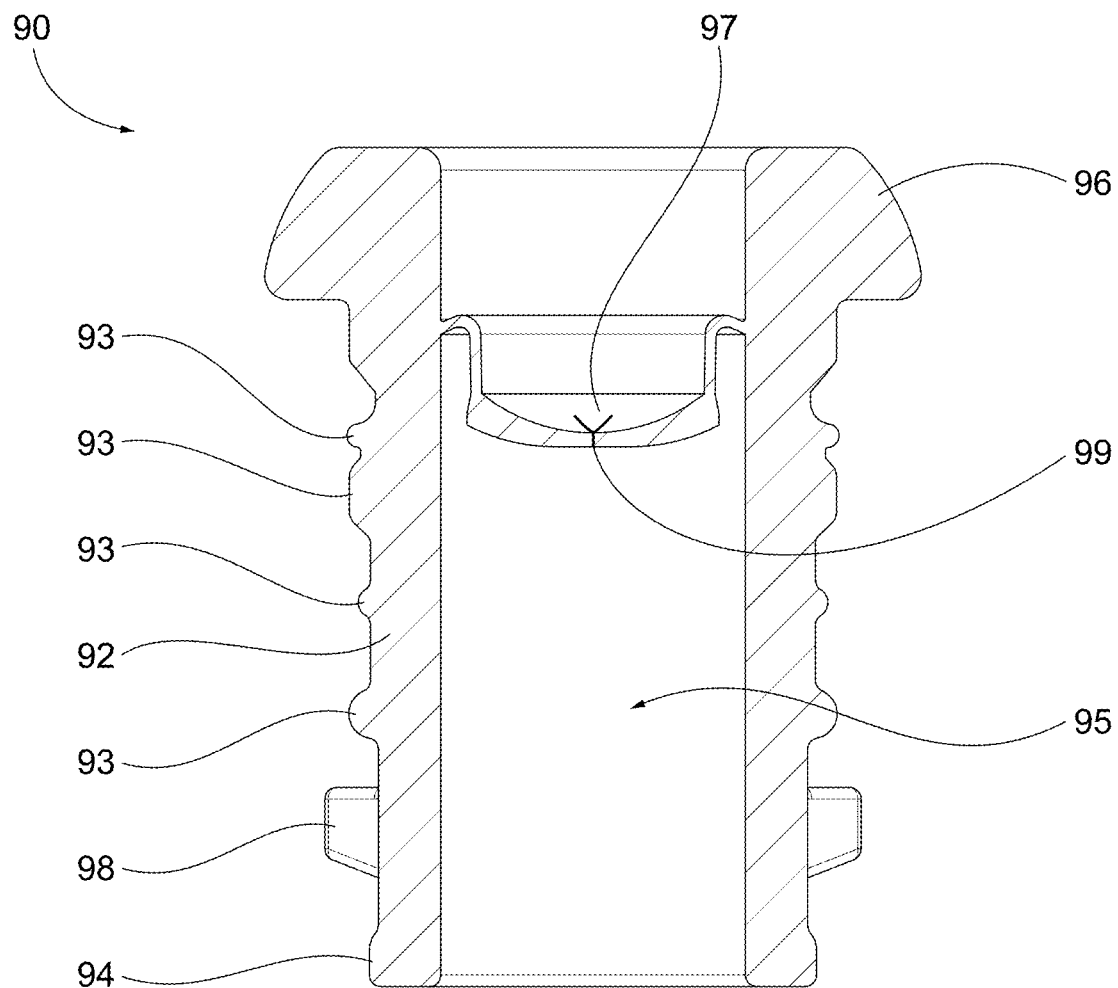
FIG. 10 is a cross-sectional view of the nozzle of FIG. 9.

A front view of the nozzle 90 is shown in FIG. 9 and a cross-sectional view of the nozzle 90 is shown in FIG. 10. The nozzle 90 includes a cylindrical nozzle body 92 and a nozzle head 96 at distal end of the nozzle body 92. In the embodiment shown, the nozzle body 92 has a diameter that is smaller than a diameter of the nozzle head 96 so that the nozzle head 96 extends radially outward with respect to the nozzle body 92. A nozzle cavity 95 is defined through the entire length of the nozzle head 96 and through the entire length of the nozzle body 92. The nozzle cavity 95 is sized to be able to receive the nozzle support 82 of the lid assembly 50.

A membrane 97 is positioned within the nozzle cavity 95. The membrane 97 includes a closable slit 99 that acts as a valve to cover the nozzle cavity 95 and prevent outside fluid from entering the nozzle cavity 95 when the bottle assembly 10 is not in use, but to allow flow of liquid from the receptacle 20, through the nozzle cavity 95 and the membrane 97 and out of the nozzle head 96. The nozzle body 92 is sized and shaped to be able to fit within the nozzle opening 85 of the lid assembly 50.

A series of nozzle ribs 93 are positioned on and extend outward from the nozzle body 92, so that the diameter of nozzle ribs 93 is greater than the diameter of the nozzle body 92. In some embodiments, the nozzle ribs 93 may have varying widths, creating a series of ribs and valleys between the ribs 93 on the nozzle body 92. The nozzle body 92 also includes a flared base 94 that extends radially outward from the nozzle body 92 so that the flared base 94 has a diameter that is greater than the diameter of the nozzle body 92.

One or more nozzle wings 98 extend from the nozzle body 92. The nozzle wings are positioned between the nozzle ribs 93 and the nozzle base 94. In the embodiment shown, there are a total of four nozzle wings 98, each equally spaced around the perimeter of the nozzle body 92. However, in other embodiments, there may be more or fewer nozzle wings 98 as desired. The nozzle wing 98 extend radially outward from the nozzle body 92 to a distance that is greater than the radial extension of the nozzle ribs 93.

In some embodiments, the nozzle body 92 has a thickness of approximately ⅛" to provide the appropriate durometer for the nozzle body 92. Alternatively, in certain other embodiments, the thickness of the nozzle body 92 may be between 1/16" and ½", depending upon the desired rigidity. As will be appreciated by those of skill in the art, other thicknesses are contemplated and should be considered within the scope of the present invention. The nozzle 90 must have sufficient thickness to maintain rigidity and a watertight seal, but still allow flexibility. Further, in some embodiments, the nozzle 90 has a height of 1⅜" and in other embodiments, the nozzle 90 has a height between approximately 1" and 1¾".

Figure 11:
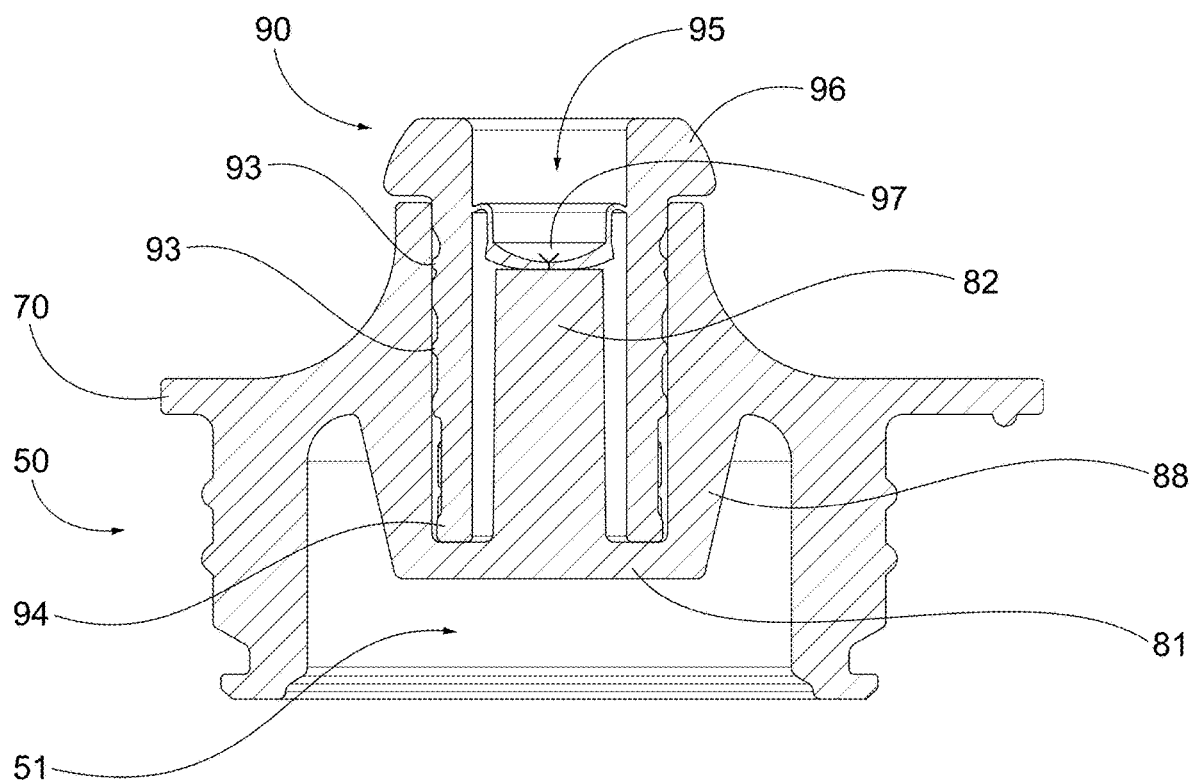
FIG. 11 is a cross-sectional view of the nozzle of FIG. 9 attached to the lid assembly of FIG. 5 and positioned in a closed position.

As shown in FIG. 11, the nozzle 90 may be removably attached to the lid assembly 50. When the nozzle 90 is attached to the lid assembly 50, at least a portion of the nozzle body 92 is positioned in the nozzle opening 85 and at least a portion of the nozzle support 82 is positioned in the nozzle cavity 95. Each of the nozzle wings 98 is positioned within a respective one of the nozzle housing openings 89 of the nozzle housing 80. This assists to properly align the nozzle 90 within the nozzle housing 80 and to prevent rotation of the nozzle 90 within the nozzle housing 80. The nozzle ribs 93 and the nozzle base 94 contact an inner surface of the nozzle opening 85 creating a friction fit that assists to retain the nozzle 90 within the nozzle opening 85 of the lid assembly 50. The nozzle 90 may be removed from the nozzle opening 85 by applying enough force on the nozzle 90 in a direction away from the lid assembly 50 to overcome the friction fit between the nozzle ribs and nozzle base 94 and the inner surface of the nozzle opening 85.

Figure 12:
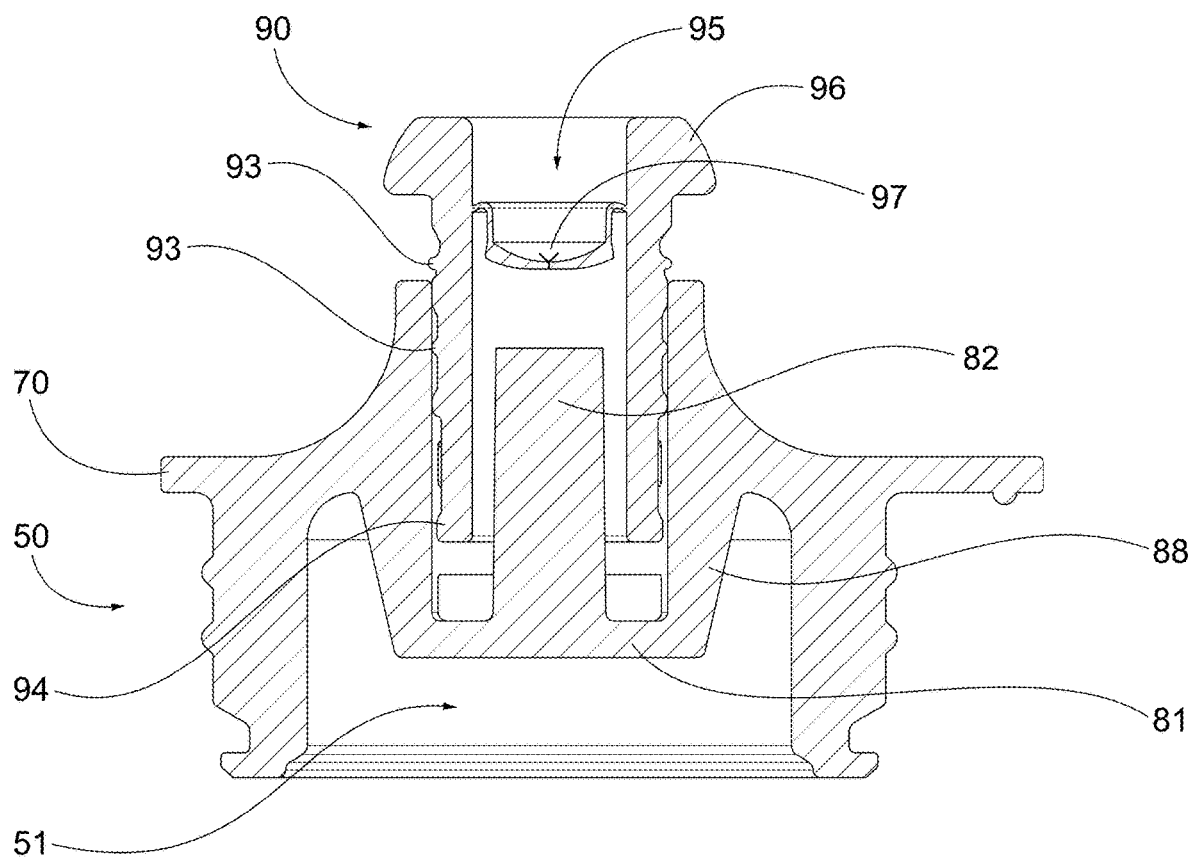
FIG. 12 is a cross-sectional view of the nozzle of FIG. 9 attached to the lid assembly of FIG. 5 and positioned in an open position.

When attached to the lid assembly 50, the nozzle 90 may be positioned in a closed position, as shown in FIG. 11, or the nozzle 90 may be positioned in a closed position, as shown in FIG. 12. In the open position, the nozzle 90 is in fluid communication with the receptacle cavity 28 so that liquid from the receptacle cavity 28 may pass through the nozzle 90. When the nozzle is in the closed position, the nozzle 90 is not in fluid communication with the receptacle cavity 28, so that liquid is unable to flow from the receptacle cavity 28 through the nozzle 90.

When the nozzle 90 is in the closed position, the nozzle 90 is positioned in nozzle opening 85 so that the nozzle body 92 is completely positioned within the nozzle opening 85. In some instances, the nozzle body 92 comes into contact with the nozzle housing bottom surface 81. The nozzle base 94 may be positioned flush against the nozzle housing bottom surface 81 so that the proximal end of the nozzle cavity 95 is covered by the nozzle housing bottom surface 81. Therefore, the liquid is prevented from flowing through the nozzle housing openings 89 and into the nozzle cavity 95.

When the nozzle 90 is in the open position, the nozzle 90 is pulled upward so that a portion of the nozzle body 92 is positioned exterior of the nozzle opening 85. In this position, there is a gap between the nozzle housing bottom surface 81 and the nozzle base 94. This gap allows liquid to flow through the nozzle housing openings 89 and into the nozzle cavity 95 of the nozzle 90. The liquid may then flow through the length of the nozzle cavity 95 and exit the nozzle 90 through the nozzle head 96.

Figure 13:
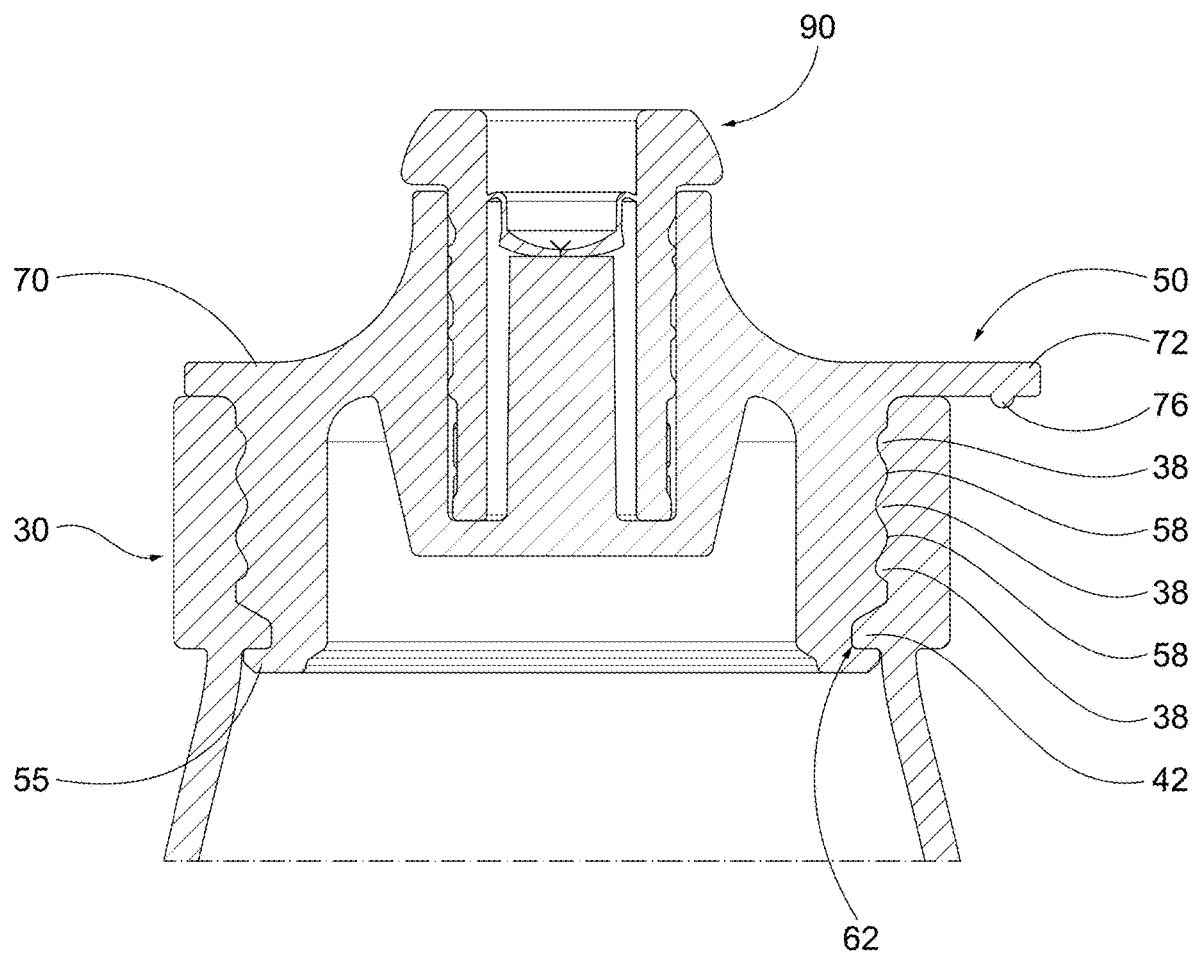
FIG. 13 is a cross-sectional view of the lid assembly of FIG. 5 and the nozzle of FIG. 9 attached to the beverage receptacle of FIG. 2.

As shown in FIG. 13, the lid assembly 50 is removably attachable to the beverage receptacle 20 at the rim section 30. The lid assembly 50 may be pushed straight downward, without rotation, into the rim section 30 until the sealing flange 42 of the rim section 30 is positioned within the sealing flange recess 62 of the lid assembly 50. The lid assembly base 55 is positioned below the sealing flange 42 to help form a seal between the lid assembly 50 and the rim section 30. The lid sealing rings 58 of the lid assembly 50 come into contact with the rim inner surface 34, while the rim sealing rings 38 of the rim section 30 come into contact with the outer lid surface 53. As shown, the lid sealing rings 58 are arranged on the lid assembly 50 to be positioned between adjacent rim sealing rings 38 to assist to create a friction fit between the lid assembly 50 and the rim section 30 and to create a seal between the lid assembly 50 and the rim section 30.

To remove the lid assembly 50 from the beverage receptacle 20, a user may grip the lid tab 72 of the lid skirt 70 and pull upward, away from the rim section 30 of the beverage receptacle 20. Sufficient upward force is required to overcome the friction fit between the interlocking rim sealing rings 38 and lid sealing rings 58 and also to remove the sealing flange 42 from the sealing flange recess 62.

In some embodiments, the lid assembly 50 may be attached to the beverage receptacle 20 at the lid assembly 50 without needing to rotate the lid assembly 50 or the beverage receptacle 20. Since the beverage receptacle 20 and the lid assembly 50 are made of a resilient material, such as silicone, the lid sealing rings 58 and the rim sealing rings 38 are capable of deforming while the lid assembly 50 is being pushed into the rim section 30 or as the lid assembly 50 is being pulled away from the rim section 30. This allows the lid sealing rings 58 and the rim sealing rings 38 to slide past each other with the application of sufficient force. Likewise, the sealing flange 42 may deform as the lid assembly is pushed into the rim section 30 or as the lid assembly 50 is pulled away from the rim section 30 to allow the lid assembly base 55 to move past the sealing flange 42 and to allow the sealing flange 42 to enter the sealing flange recess 62.

In some embodiments, each of the rim sealing rings 38 and each of the lid sealing rings 58 may each be positioned in a respective rim sealing ring plane and lid sealing ring plane that is parallel to the receptacle base plane defined by the receptacle base 20. Additionally, each rim sealing ring plane and each lid sealing ring plane is parallel with to each of the other rim sealing ring planes and lid sealing ring planes. Therefore, the lid assembly 50 is not screwed onto the rim section 30 to attach the lid assembly 50 to the rim section 30. Instead, a user is required to use a translational force to attach the lid assembly 50 to the rim section 30 by a friction fit or to remove the lid assembly 50 from the rim section 30.

In some embodiments, each of the components of the bottle assembly 10 is formed principally or entirely from silicone—a synthetic rubber. The novel receptacle may be formed by suitable manufacturing methods such as injection molding or the like. Silicone is a low taint, non-toxic material, which meets the necessary requirements when contact with food is required. Silicone is already important product in the cookware industry, particularly bakeware and kitchen utensils, where rigidity is not a primary concern. It is used as an insulator in heat resistant potholders and similar, however it is more conductive of heat than the less dense fiber-based ones. Silicone oven mitts are able to withstand temperatures up to 357° C. (675° F.), and allow reaching into boiling water. According to the illustrated embodiment, the bottle assembly 10 utilizes silicone within the same parameters as set forth by the FDA with respect to specified thicknesses and durometer.

Nevertheless, other pliable materials may be utilized without departing from the scope of the inventions. It shall be appreciated that any of a group of semi-inorganic polymers based on the structural unit R2SiO, where R is an organic group, characterized by wide-range thermal stability, high lubricity, extreme water repellence, and physiological inertness can be considered in the silicone family of products.

Furthermore, the inventive drinkware may be customized or personalized, such as by the inclusion of a logo on bottle assembly 10. The unique properties of silicone allow the ability to apply printed or embedded physical logos to the outside surface or any other surface of the drinkware. Using appropriate inks and processes, these products can receive a variety of designs, and be used as retail housewares and promotional products.

Additionally, the silicone utilized can be produced in any Pantone color, or without pigment so as to be rendered nearly translucent. It is also possible to add to the raw material an additive that renders the finished cup phosphorescent (i.e., glow in the dark).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the invention as described herein and/or by the following claims are desired to be protected.

The invention claimed is:

1. A bottle assembly comprising:
 a beverage receptacle including a base and at least one sidewall and defining a receptacle cavity;
 a rim section at a distal end of said beverage receptacle, wherein said rim section includes an inner rim surface, one or more rim sealing rings extending from said inner rim surface into said receptacle cavity, and a sealing flange extending from said inner rim surface into said receptacle cavity, wherein said sealing flange extends farther radially inward into said receptacle cavity than said one or more rim sealing rings;
 a lid assembly including an outer lid surface, one or more lid sealing rings extending radially outward from said outer lid surface and a sealing flange recess defined in said outer lid surface, and wherein said lid assembly includes a nozzle housing;
 a nozzle defining a nozzle cavity, wherein said nozzle is positionable within said nozzle housing of said lid assembly so that said nozzle is translatable within said nozzle housing of said lid assembly;
 wherein said lid assembly is positionable within said receptacle cavity at said rim section so that said lid assembly is removably attachable to said beverage receptacle, and wherein said rim sealing rings interlock with said lid sealing rings when said lid assembly is attached to said beverage receptacle;
 wherein said sealing flange of said rim section is positioned within said sealing flange recess when said lid assembly is attached to said beverage receptacle at said rim section; and
 wherein the beverage receptacle, said rim section, said lid assembly, and said nozzle are each made substantially of silicone.

2. The bottle assembly of claim 1, wherein said base of said beverage receptacle defines a receptacle base plane and said one or more rim sealing rings each define a respective rim sealing ring plane, and wherein each of the rim sealing ring planes is parallel with respect to said receptacle base plane.

3. The bottle assembly of claim 2, wherein each of said lid sealing rings defines a respective lid sealing ring plane, and wherein each lid sealing ring plane is parallel with respect to each of the rim sealing ring planes.

4. The bottle assembly of claim 1, wherein said nozzle is removably attachable to said lid assembly.

5. The bottle assembly of claim 1, wherein said nozzle is positionable in an open position within said nozzle housing wherein said nozzle cavity is in fluid communication with said receptacle cavity, and wherein said nozzle is positionable in a closed position within said nozzle housing wherein fluid within said receptacle cavity is unable to flow from said receptacle cavity into said nozzle cavity.

6. The bottle assembly of claim 1, wherein the beverage receptacle, said rim section, said lid assembly, and said nozzle are all made entirely of silicone.

7. The bottle assembly of claim 1, wherein said nozzle includes a nozzle body, wherein one or more nozzle ribs extend radially outward from said nozzle body.

8. The bottle assembly of claim 7, wherein said nozzle includes one or more nozzle wings extending radially outward from said nozzle body, and wherein said one or more nozzle wings each extend radially outward from said nozzle body at a distance that is greater than the distance extended by each of said one or more nozzle ribs.

9. The bottle assembly of claim 1, wherein said lid assembly is configured to be attachable to said rim section of said beverage receptacle by applying a translational force and without rotation of said lid assembly or said beverage receptacle.

\* \* \* \* \*